US005639062A

United States Patent [19]

Irgens et al.

[11] Patent Number: 5,639,062

[45] Date of Patent: Jun. 17, 1997

[54] MODIFIED HEEL VALVE CONSTRUCTION

[75] Inventors: Christopher R. Irgens, Elm Grove; Francis A. McGinnity, Hartland, both of Wis.

[73] Assignee: Outboard Marine Corporation, Waukegan, Ill.

[21] Appl. No.: 507,058

[22] Filed: Jul. 25, 1995

[51] Int. Cl.[6] .............................. F16K 47/00; F16K 31/00

[52] U.S. Cl. .............................................. 251/120; 251/903

[58] Field of Search .................................... 251/120, 121, 251/118, 282, 903; 137/903

[56] References Cited

U.S. PATENT DOCUMENTS

| | | | |
|---|---|---|---|
| 2,375,492 | 5/1945 | Purdy et al. | 251/145 |
| 2,421,329 | 5/1947 | Hoffer | 210/166 |
| 3,330,543 | 7/1967 | Mennesson | 251/903 X |
| 3,605,793 | 9/1971 | Kinsel | 136/320.06 |
| 3,987,814 | 10/1976 | Hall | 137/469 |
| 4,394,970 | 7/1983 | Hoffman et al. | 239/453 |
| 4,499,871 | 2/1985 | Neitz et al. | 123/276 |
| 4,529,165 | 7/1985 | Lehrach | 251/139 |
| 4,591,100 | 5/1986 | Gaskell et al. | 239/533.3 |
| 4,648,421 | 3/1987 | Chant et al. | 137/312 |
| 4,804,324 | 2/1989 | Yoshinaea | 251/903 X |
| 5,081,978 | 1/1992 | Sumida et al. | 251/121 X |
| 5,094,266 | 3/1992 | Ledbetter | 137/469 |
| 5,127,583 | 7/1992 | Taue | 239/96 |
| 5,199,398 | 4/1993 | Nylund | 123/299 |
| 5,259,348 | 11/1993 | Kobayashi et al. | 123/260 |
| 5,323,807 | 6/1994 | Gauld et al. | 137/903 X |
| 5,392,745 | 2/1995 | Beck | 123/295 |

FOREIGN PATENT DOCUMENTS

| | | | |
|---|---|---|---|
| 403225069 | 4/1991 | Japan . | |
| 2113303 | 8/1983 | United Kingdom | 61/18 |
| 2113670 | 8/1983 | United Kingdom | 61/18 |

*Primary Examiner*—Hoang Nguyen
*Attorney, Agent, or Firm*—Michael, Best & Friedrich

[57] ABSTRACT

Disclosed herein is a valve construction comprising a main body having therein a bore extending along an axis, adapted to contain fuel under pressure, and having, at the axially outer end thereof, an axially outwardly diverging conical surface extending at a first acute angle to the axis, and a needle valve located in the axial bore, movable relative to the main body between open and closed positions, and including a stem portion, and a head portion including a first diverging conical surface which extends axially outwardly from the stem portion at a second acute angle greater than the first acute angle and terminates in a first edge which, when the needle valve is in the closed position, sealingly engages the conical surface of the main body, and which has a diameter, a second surface which extends axially outwardly from the first edge in increasingly spaced relation from the conical surface of the main body and then in decreasingly spaced relation from the conical surface of the main body and which terminates in a second edge having a diameter substantially greater than the diameter of the valve edge, and a diverging conical surface which extends axially outwardly from the second edge and which, when the needle valve is in the closed position, is located in slightly spaced parallel relation to the conical surface of the main body.

6 Claims, 5 Drawing Sheets

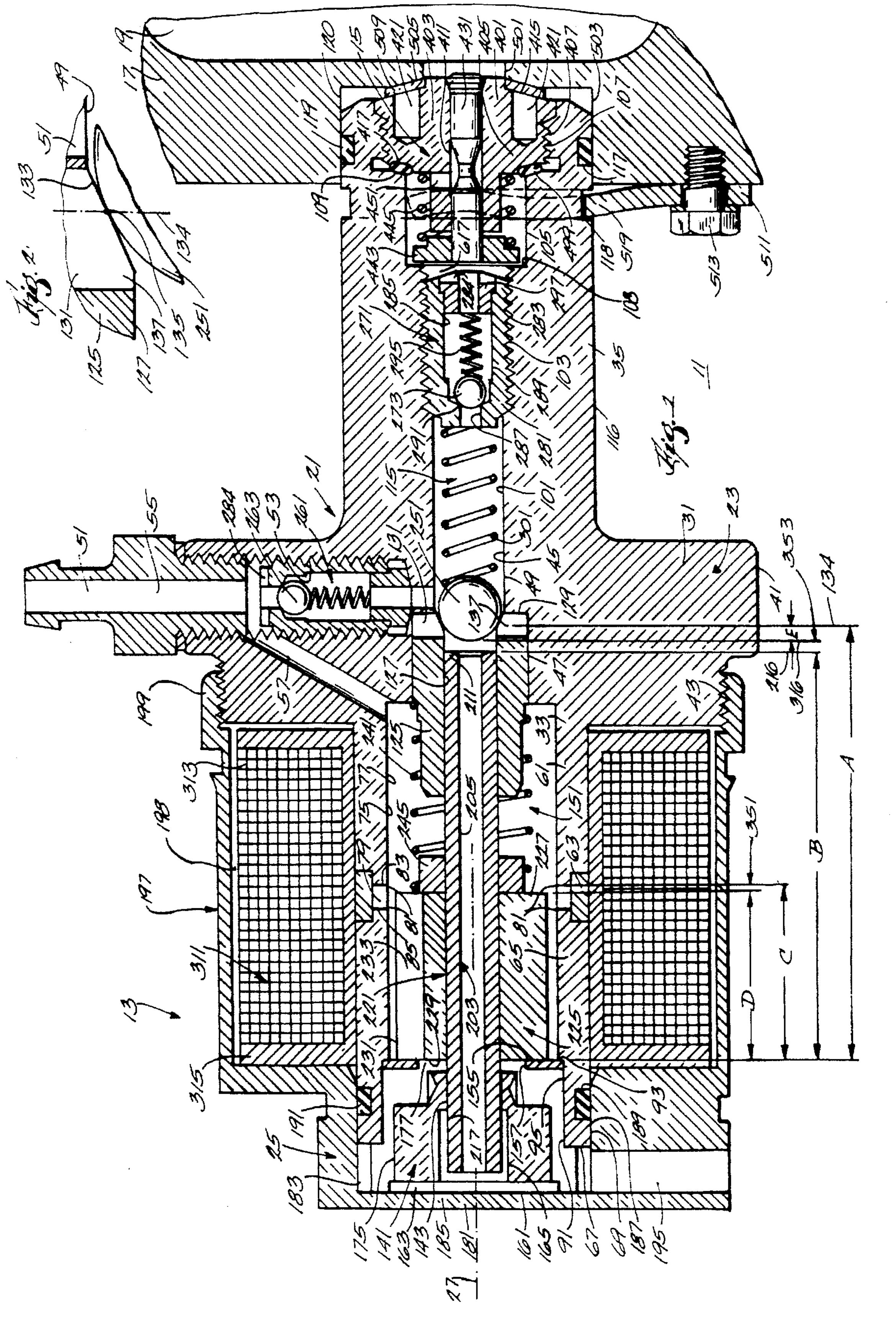

103
118
517
515
511
17
517
519
513

289
685
681
683
291
686
684
273
617
281

11
103
118
591
511
513
17
7
7

611
35
645
295
101
653
623
655
615
671
617
651
637
631
621
634
641
635
647
643
648
646
644
649
661

MODIFIED HEEL VALVE CONSTRUCTION

BACKGROUND OF THE INVENTION

The invention relates to nozzle assemblies fuel pumps and for combined fuel pump and nozzle assemblies and, more particularly, to valve seat and valve head constructions.

Attention is directed to the following U.S. Pat. Nos.:

2,375,492 Issued May 8, 1945
2,421,329 Issued May 27, 1947
3,605,793 Issued Sep. 20, 1971
3,987,814 Issued Oct. 26, 1976
4,394,790 Issued Jul. 26, 1983
4,499,871 Issued Feb. 19, 1985
4,529,165 Issued Jul. 16, 1985
4,591,100 Issued May 27, 1986
4,648,421 Issued Mar. 10, 1987
5,094,266 Issued Mar. 10, 1992
5,127,583 Issued Jul. 7, 1992
5,199,398 Issued Apr. 6, 1993
5,259,348 Issued Nov. 9, 1993
5,392,747 Issued Feb. 28, 1995

Attention is also directed to the following foreign patents:

GB 2113670 Published Aug. 10, 1983
GB 2113303 Published Aug. 3, 1983
JP 403225069 Published October, 1991
DE 823236

SUMMARY OF THE INVENTION

The invention provides a valve construction comprising a main body having therein a bore extending along an axis, adapted to contain fuel under pressure, and having, at the axially outer end thereof, an axially outwardly diverging conical surface extending at a first acute angle to the axis, and a needle valve located in the axial bore, movable relative to the main body between open and closed positions, and including a stem portion, and a head portion including a first diverging conical surface which extends axially outwardly from the stem portion at a second acute angle greater than the first acute angle and terminates in a first edge which, when the needle valve is in the closed position, sealingly engages the conical surface of the main body, and which has a diameter, a second surface which extends axially outwardly from the first edge and radially outwardly from axis and which terminates in a second edge having a diameter substantially greater than the diameter of the first edge, and a diverging conical surface which extends axially outwardly from the second edge and which, when the needle valve is in the closed position, is located in slightly spaced parallel relation to the conical surface of the main body.

The invention also provides a valve construction comprising a main body having therein a bore extending along an axis, adapted to contain fuel under pressure, and having, at the axially outer end thereof, an axially outwardly diverging conical surface extending at a first acute angle to the axis, and a needle valve located in the axial bore, movable relative to the main body between open and closed positions, and including a stem portion, and a head portion including a first diverging conical surface which extends axially outwardly from the stem portion at a second acute angle greater than the first acute angle and terminates in a first edge which, when the needle valve is in the closed position, sealingly engages the conical surface of the main body, and which has a diameter, a second surface which extends axially outwardly from the first edge in increasingly spaced relation from the conical surface of the main body and then in decreasingly spaced relation from the conical surface of the main body and which terminates in a second edge having a diameter substantially greater than the diameter of the first edge, and a diverging conical surface which extends axially outwardly from the second edge and which, when the needle valve is in the closed position, is located in slightly spaced parallel relation to the conical surface of the main body.

The invention also provides a valve construction comprising a main body having therein a bore extending along an axis, adapted to contain fuel under pressure, and having, at the axially outer end thereof, an axially outwardly diverging conical surface extending at a first acute angle to the axis, and a needle valve located in the axial bore, movable relative to the main body between open and closed positions, and including a stem portion, and a head portion including a first diverging conical surface which extends axially outwardly from the stem portion at a second acute angle greater than the first acute angle and terminates in a first edge which, when the needle valve is in the closed position, sealingly engages the conical surface of the main body, and which has a diameter, a second surface which includes a first portion extending axially outwardly from the first edge in diverging relation to the conical surface of the main body, and a second portion extending axially outwardly from the first portion in converging relation to the conical surface of the main body and terminating in a second edge having a diameter greater than the diameter of the first edge, a diverging conical surface which extends axially outwardly from the second edge, which, when the needle valve is in the closed position, is located in slightly spaced parallel relation to the conical surface of the main body and which terminates in a third edge, and a converging conical surface which extends axially outwardly from the third edge.

Other features and advantages of the invention will become apparent to those skilled in the art upon review of the following detailed description, claims and drawings.

DESCRIPTION OF THE DRAWINGS

FIG. 1 is a sectional view of a combined fuel pump and fuel injection nozzle assembly embodying various of the features of the invention.

FIG. 2 is an enlarged sectional view of a portion of the combined assembly illustrated in FIG. 1.

Figure 3:
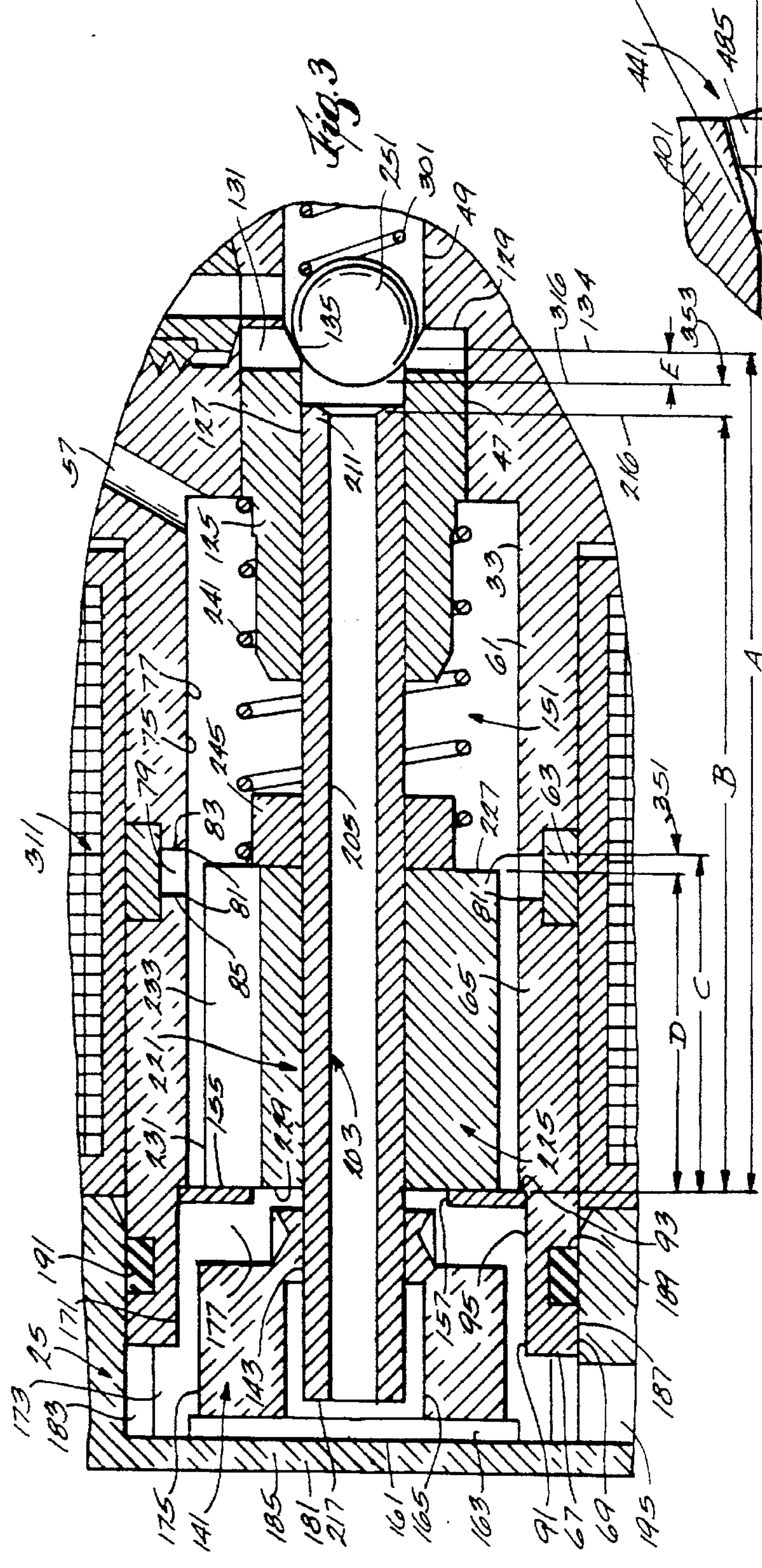
FIG. 3 is an enlarged sectional view of a larger portion of the combined assembly illustrated in FIG. 1.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in FIG. 1 of the drawings is a combined fuel pump and fuel injection nozzle assembly 11 which comprises a fuel pump 13 and a fuel injection nozzle assembly 15 and which is mounted on a cylinder head 17 with the nozzle assembly 15 in communication with a combustion chamber 19 defined, in part, by the cylinder head 17.

The fuel pump 13 comprises a housing assembly 21 which can be variably constructed and which, in the construction disclosed in FIG. 1, includes, in part, a first housing member 23 and a second housing member 25.

The first housing member 23 is constructed of low reluctance ferrous material, such as iron, has an axis 27, and includes a main body portion 31, a first projecting portion 33 which extends axially in one direction from the main body portion 31, and a second projecting portion 35 which extends axially from the main body portion 31 in the other direction. The main body portion 31 extends transversely to the axis 27 and includes a cylindrical outer surface portion 41 which includes a threaded part 43. Internally thereof, the main body portion 31 of the first housing member 23 includes an axial bore 45 having a large diameter portion 47 and an adjacent small diameter portion 49, together with a fuel inflow passage or conduit 51 communicating with the small diameter portion 49 of the axial bore 45, being adapted to communicate with a suitable source of fuel under low pressure (not shown), and having a first portion 53 which is internally threaded to receive an inlet valve cartridge (still to be described), and which is located adjacent to the axial bore 45, and a second portion 55 located radially outwardly (relative to the axis 27) of the first portion 53.

In addition, the main body portion 31 of the first housing member 23 includes a fuel by-pass passage 57 extending from the second portion 55 of the fuel inflow passage 51 and communicating with a low pressure fuel chamber (still to be described).

The first projecting portion 33 of the first housing member 23 is fabricated of three initially separate sections or sub-portions which are unified in any suitable manner, such as by brazing. In this last regard, the first projecting portion 33 includes (see FIGS. 1 and 3) a first section or sub-portion 61 which integrally extends from and is, initially, an integral portion of a one- piece member or part which also includes the main body portion 31.

The first projecting portion 33 also includes a second section or sub-portion 63 which is fabricated from a material having a high reluctance and which, after unification, as by brazing, extends axially from the first section or sub portion 61. While other materials could be employed, such as bronze, in the disclosed construction, the second section 63 is fabricated from series 300 stainless steel.

The first projecting portion 33 also includes a third section or sub-portion 65 which is fabricated from a material having a low reluctance, and which, after unification, as by brazing, extends axially from the second section 63. While other materials could be employed, in the disclosed construction, the third section is fabricated from the same material as the main body portion 31 and includes an outer end 67. In addition the unified projecting portion 33 includes a cylindrical outer surface 69.

The unified first projecting portion 33 includes an axial bore 75 which extends in the first, second, and third sections, and which communicates with the fuel by-pass passage 57 and with the large diameter portion 47 of the axial bore 45 in the main body portion 31. The axial bore 75 in the first projecting portion 33 includes a cylindrical inner surface 77 having therein an annular groove 79 which constitutes a magnetic gap and which is defined radially inwardly of the second section 63 by inner and outer radial surfaces 83 and 85 which, together with the cylindrical inner surface 77 define relatively sharp corners which constitute magnetic poles or shoes 81. In addition, the axial bore 75 includes a counterbore 91 which is located at the outer end 67 of the third section 65 and which defines an annular shoulder 93, and a cylindrical inner surface 95.

The second projecting portion 35 of the first housing member 23 extend integrally in one-piece from the main body portion 31 in a direction opposite to the projection of the first projecting portion 33 and includes (see FIG. 1) an axial bore 101 which constitutes a continuation of, and communicates with, the small diameter portion 49 of the axial bore 45 in the main body portion 31. The axial bore 101 includes a portion 103 of uniform internal diameter which is, preferably, threaded to receive a fuel outlet valve cartridge (still to be described). Downstream of the threaded portion 103, the axial bore 101 includes a first counterbore 105 and a second counterbore 107 which is internally threaded to threadedly receive the nozzle assembly 15. Between the bore portion 103 and the first counterbore, the second projecting portion 35 includes a shoulder 108. Between the first and second counter bores 105 and 107, the second projecting portion 35 includes an inclined sealing surface 109. The portion of the axial bore 101 upstream of the threaded portion 103, i.e., upstream of the fuel outlet valve cartridge, and the smaller diameter portion 49 of the axial bore 45 in the main body portion 31, as well as that portion downstream of the first or threaded portion 53 of the fuel inflow passage 51, i.e., downstream of the fuel inflow valve cartridge, constitute a high pressure fuel chamber 115 which forms part of a high pressure fuel circuit (still to be described).

The second projecting portion 35 also includes an outer cylindrical surface 116 including, adjacent the outer end thereof, axially spaced outer and inner grooves 117 and 118. The outer groove 117 contains an o-ring 119 engageable with a bore 120 in the fragmentarily shown cylinder head 17 and the inner groove 118 is adapted to assist in fixing the combined fuel pump and nozzle assembly 11 on the cylinder head 17 as will be explained hereinafter.

In addition, the first housing member 23 includes a bearing or bushing 125 fabricated of bronze or other suitable bearing material which is also preferably of high reluctance. The bearing or bushing 125 is fixed, as by, for instance, by press fitting, in the large diameter portion 47 of the axial bore 45 in the main body portion 31, and includes an axial bore 127 which communicates between the axial bore 45 in the main body portion 31 and the axial bore 75 in the first projecting portion 33. The bushing 125 also includes an end surface 129 which includes (see FIG. 2) a diametric slot 131 and which engages the shoulder formed between the large diameter and small diameter portions 47 and 49 of the axial bore 45 in the main body portion 31. In addition, the end surface 129 is provided with a conically shaped recess 133 which is engaged by a valve member (still to be described), and, at a line or plane or narrow area 134 of engagement, provides a valve stop or member stop 135 limiting movement of the valve member to the left in FIG. 1. The diametral slot 131 extends more deeply into the bushing 125 than the valve stop 135 and, thus, provides a pair of fuel flow passages 137 extending in parallel relation to the fuel by-pass passage 57 and communicating between the small diameter portion 49 of the axial bore 45 in the main body portion 31 and the axial bore 127 in the bushing 125, notwithstanding engagement of the valve member with the valve stop 135.

Forming a part of the fuel pump 13 and located in the counterbore 91 at the outer end 67 of the third section 65 of the first projecting portion 33 of the first housing member 23 is a stop member or end cap or closure member 141 (see FIGS. 1 and 3) which is in radial engagement with the cylindrical inner surface 95 of the counterbore 91 in the third section 65 of the first projecting portion 33, and in axial engagement with the annular shoulder 93 thereof. The stop member 141 includes an axial bearing or bore 143 receiving in sliding engagement a remote end of a tubular member (still to be described) and fuel flow passages which will be described in greater detail hereinafter and which communicate with a fuel passage (still to be described) in the tubular member and with the axial bore 75 in the first projecting portion 33. The stop member 141, together with the axial bore 75 in the first projecting portion 33, define a low pressure fuel chamber 151 which forms part of a low pressure fuel circuit (still to be described).

More particularly, the stop member 141 is preferably fabricated from high reluctance bearing material, such as bronze, is generally cylindrical in shape, and includes (see FIG. 3) an inner generally planar end surface 155 which engages the annular shoulder 93 in the third section 65 and which includes a shallow fuel flow recess or counterbore 157 which communicates at all times with the low pressure fuel chamber 151.

Figure 4:
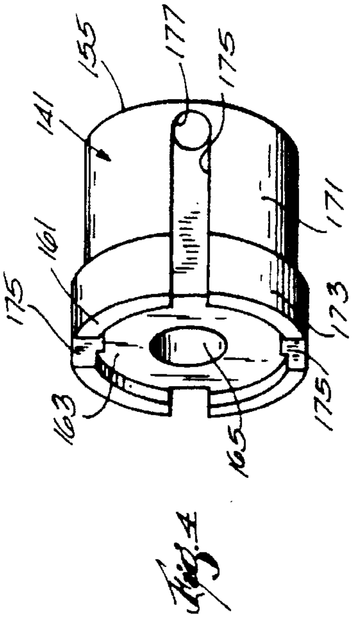
FIG. 4 is a perspective view of the stop member included in the construction shown in FIG. 1.
Figure 7:
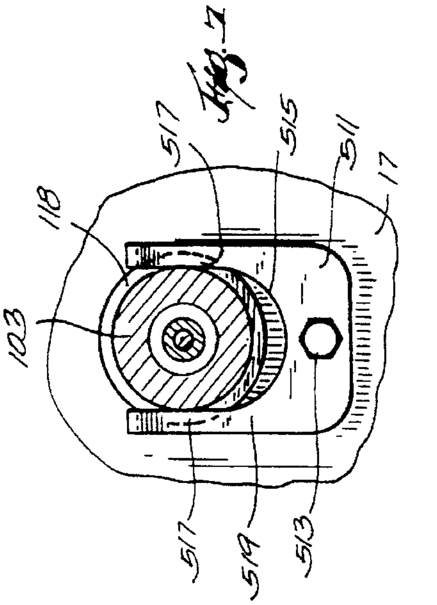
FIG. 7 is a fragmentary view taken along line 7—7 of FIG. 6.

The stop member 141 also includes (see also FIG. 4) an outer end surface 161 which is axially engaged by an end wall of a blind bore in an end portion (still to be described) of the second housing member 25. The outer end surface 161 includes a shallow fuel flow recess or counterbore 163 (see FIGS. 3 and 4) which communicates with a fuel flow counterbore 165 which, in turn, communicates with the axial bore 143. In addition, the stop member 141 includes a generally cylindrical outer surface 171 which engages the cylindrical inner surface 95 of the counterbore 91 in the third section 65 of the first projecting portion 33 and, adjacent the outer end surface 161, has a radially extending flange 173 which is located in spaced relation to the blind bore in the end portion (still to be described) of the second housing member 25. The generally cylindrical outer surface 171 also includes one or more (four in the illustrated construction) axially extending fuel flow slots or grooves 175 which also extend through the flange 173, which, at the outer end thereof, communicate with the fuel flow recess or counterbore 163, and which, at the inner end thereof, communicate with respective radial fuel flow passages 177 which, in turn, communicate with the fuel flow recess or counterbore 157 in the inner end surface 155.

The second housing member 25 of the fuel pump 13 includes (see FIGS. 1 and 3) an end portion 181 including a blind axial bore 183 opening in the direction toward the first housing member 23, at least partially receiving the stop member 141, communicating with the fuel passages in the stop member 141, and having a transverse end wall 185 in axial engagement with the outer end surface 161 of the stop member 141, and an internal cylindrical surface 187 extending from the end wall 185 and receiving and sealingly engaging the radially outer cylindrical surface portion 69 of the end of the third section 65 of the first projecting portion 33. In this last regard, while other constructions can be employed, in the disclosed construction, in order to prevent fuel leakage from the low pressure fuel circuit, one of the mating internal and external cylindrical surfaces 69 and 187 includes an annular groove 189 housing an o-ring 191 which sealingly engages between the first projecting portion 33 and the end portion 181 of the second housing member 25. In addition, the end portion 181 of the second housing member 25 also includes a low pressure fuel outlet or fuel outflow passage 195 communicating with the blind axial bore 183 and therefore with the fuel flow passages in the stop member 141.

The second housing member 25 also includes (see FIG. 1) a cylindrical portion 197 extending from the end portion 181 toward the first housing member 23 in outwardly spaced radial relation to the outer surface of the first projecting portion 33 to define therebetween, and between the main body portion 31 and the end portion 181, an annular volume 198. At the outer end thereof, the cylindrical portion 197 includes a threaded part 199 threadedly fixed to the threaded part 43 of the main body portion 31 of the first housing member 23 to axially engage the end wall 185 of the second housing member 25 with the stop member 141 and to axially engage the stop member 141 with the annular shoulder 93 of the third section 65 of the first projecting portion 33.

The fuel pump 13 also includes an armature assembly 221 including an tubular member or rod 203 which is, preferably, fabricated of steel, which slideably and substantially sealingly extends (at the right end thereof) in the axial bore 127 in the bearing or bushing 125, and which slideably extends (at the left end thereof) in the axial bore or bearing 143 in the stop member 141. Accordingly, the tubular member 203 is supported for reciprocating movement at both ends, thereby providing for more reliable operation of the fuel pump 13.

The tubular member or rod 203 includes an axial bore or fuel passage 205 communicating through the by-pass fuel flow passages 137 in the bushing 125 and between the small diameter portion 49 of the axial bore 45 in the main body portion 31 (i.e., the high pressure fuel chamber 115) and the counterbore 165 in the stop member 141. The tubular member 203 also includes an end 211 which is located adjacent the main body portion 31 and which includes (see FIG. 17) a conical surface 213 defining a valve seat 215 which extends along a line or plane or narrow area 216 of engagement and which faces the small diameter portion 49 of the axial bore 45 in the main body portion 31. The tubular member 203 also includes an end 217 which is remote from the main body portion 31 and which is normally in the counterbore 165 in the stop member 141.

The armature assembly 221 also includes an armature member 225 which is fabricated of low reluctance material, such as iron, which includes inner and outer end surfaces 227 and 229 respectively. The armature member 225 is fixed on the tubular member 203, located in the axial bore 75 in the first projecting portion 33 (i.e., in the low pressure fuel chamber 151), and is dimensioned to permit fuel flow in the axial bore 75 in the first projecting portion 33 around the armature member 225 i.e., axially of the bore 75 in the projecting portion 33 between the end surfaces 227 and 229. While other arrangements can be employed, in the disclosed construction, the armature member 225 includes a generally cylindrical outer surface 231 having therein one or more axial slots or fuel flow passages 233 which are diametrically spaced at a distance less than the diameter of the recess 157 in the stop member 141 so as to always communicate with the recess 157 in the inner end surface 155 of the stop member 141.

The fuel pump 13 also includes a spring 241 located in the axial bore 75 in the first projecting portion 33, i.e., in the low pressure fuel chamber 151, and operative to bias the armature assembly 221 to a retracted position (shown in FIG. 1) in remotely spaced relation from the main body portion 31 and including a first end in surrounding relation to the bearing or bushing 125 and engaged with the main body portion 31, and a second end which engages the inner end surface 227 of the armature member 225. Preferably, a combined bumper and guide member 245 is located within the end coils of the second end of the spring 241 and in engagement with the inner end surface 227 of the armature member 225 so as to prevent radial movement of the second end of the spring 241 and so as to limit movement of the armature member 225 to the right in FIG. 1, thereby preventing contact between the armature member 225 and the housing. The guide member 245 can fabricated of any suitable material, such as plastic.

The fuel pump 13 also includes a valve member 251 which is located in the small diameter portion 49 of the axial bore 45 in the main body portion 31, i.e., in the high pressure fuel chamber 115, which is movable toward and away from the valve stop 135, and which, preferably, is fabricated of steel and is a ball member, i.e., is spherical in shape.

The fuel pump 13 also includes valve means controlling fuel inflow to, and fuel outflow from, the high pressure fuel chamber 115. While other constructions can be employed, in the disclosed construction, the fuel pump 13 includes a fuel inflow valve cartridge 261 which is suitably fixed in the first portion 53 of the fuel inflow passage 51 between the axial bore 45 in the main body portion and the fuel by-pass passage 57 and which includes a valve member 263 preventing fuel outflow and permitting fuel inflow when the fuel pressure in the axial bore 45 in the main body portion 31 is below a predetermined level.

The fuel pump 13 also includes a fuel outflow valve cartridge 271 which is suitably fixed in the portion 103 of the axial bore 101 in the second projecting portion 35 in spaced relation to the valve member 251 and including a valve member 273 preventing fuel inflow and permitting fuel outflow when the fuel pressure is above a predetermined level.

While other constructions can be employed, in the disclosed construction, the valve cartridges 261 and 271 are generally identically constructed and both include an outer housing 281 which is generally cylindrical in shape and which includes an outer surface which includes a threaded portion 283 affording respective fixing of the valve cartridges 261 and 271 in the fuel inflow passage 51 and in the axial bore 101 of the second projecting portion 35. To facilitate threading the valve cartridges 261 and 271 in the respective bores, each has a feature or recess, such as a slot 284, for receipt of a tool, such as a screwdriver. Alternately, if desired the valve cartridges 261 and 271 can be press fitted into the fuel inflow passage 51 and in the bore 101. The outer housing 281 also includes a through bore 285 which, at one end, includes an inlet portion 287, and which, at the other end, includes a counterbore 289. Between the counterbore 289 and the inlet portion 287 of the through 285 bore is a valve seat 291. Located in the counterbore 289 is the ball valve member 263 or 273 which is biased against the valve seat 291 by a suitable spring 295 which, at one end, bears against the ball valve member 263 or 273, and which, at the other end, bears against a stop member 297 which is suitably fixed in the counterbore 289 and which is centrally apertured to afford fuel flow through the outer housing 281 subject to whether or not the valve member 263, 273 is seated against the valve seat 291. Of course, the springs 295 in the fuel inlet and outlet cartridges 261 and 271 have differing spring rates to afford control of fuel flow through the valve cartridges. Use of the disclosed valve cartridges 261 and 271 permits purchase thereof as finished components and lessens the cost of manufacture.

The fuel pump 13 also includes a spring 301 located in the axial bore 101 in the second projecting portion 35 and between the valve member 251 and the outflow valve cartridge 271 and having a first end bearing against the valve member 251 and a second end bearing against the outflow valve cartridge 271 so as to normally seat the valve member 251 against the valve stop 135 on the bearing or bushing 125.

Figures 10, 16, 17:
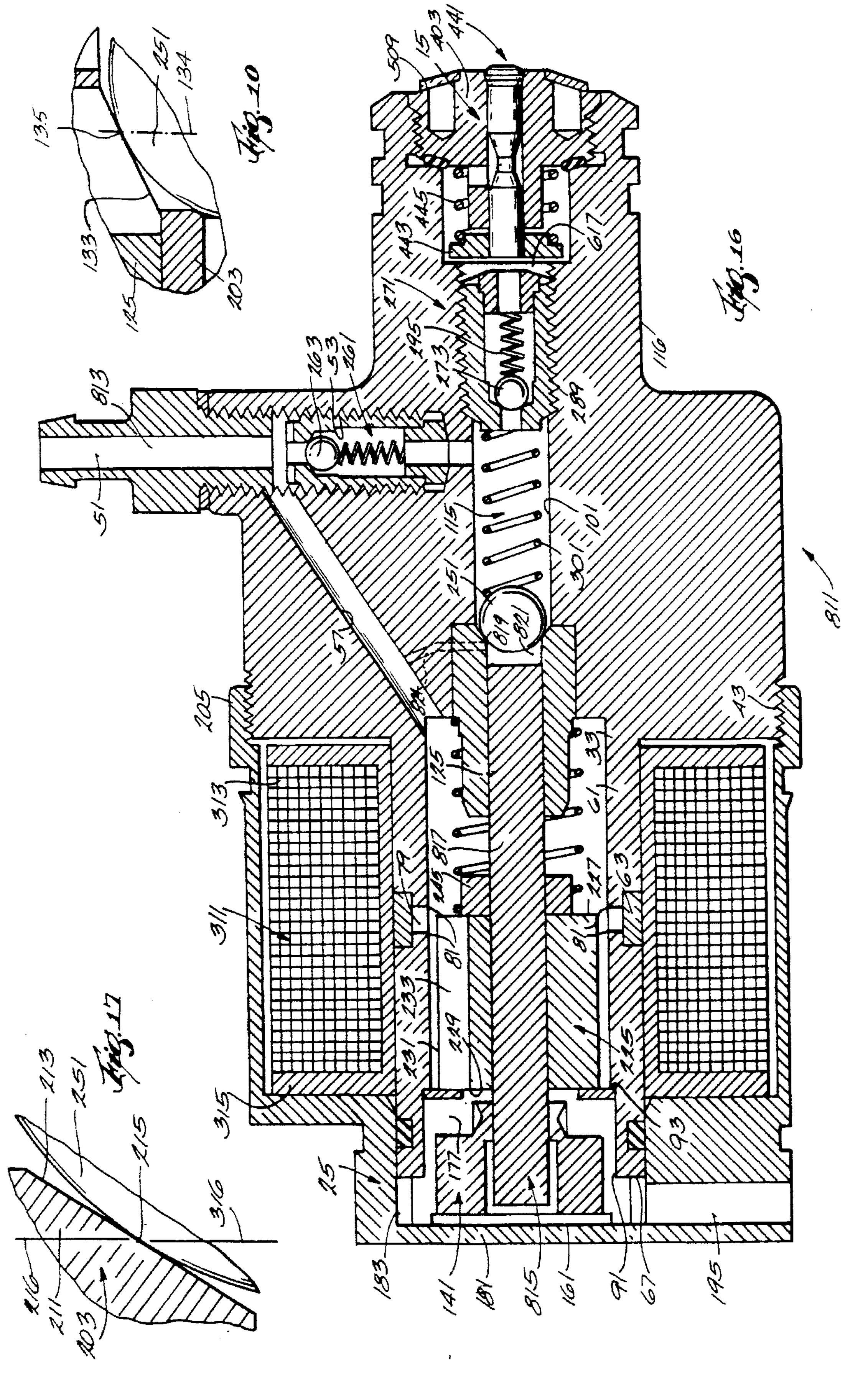
FIG. 10 is a view similar to FIG. 2 showing the tubular member engaging the valve member.
FIG. 16 is a sectional view of another embodiment of a combined fuel pump and fuel injection nozzle assembly embodying various of the features of the invention.
FIG. 17 is an enlarged portion of FIG. 10.

The fuel pump 13 also includes a solenoid 311 which, in addition to the armature member 225, also includes an electrical coil 313 which is wound on a bobbin 315 located in the annular volume 198. The electrical coil 313 includes a suitable number of windings wound from a suitable electrical wire and having suitable electrical leads. The electrical coil 313 is operable, when energized, to move the armature assembly 221 from the retracted position (shown in FIGS. 1 and 3) in the direction toward the valve member 251 so as to sealingly engage the valve seat 215 with the valve member 251 (shown in FIG. 17), thereby closing communication between the axial fuel passage 205 in the tubular member 203 and the axial bore 45 in the main body portion 31, and so as to displace the valve member 251 toward the fuel outflow valve cartridge 271, thereby pressurizing the fuel between the valve member 251 and the fuel outflow valve cartridge 271, i.e., pressurizing the fuel in the high pressure fuel chamber 115. As shown in FIG. 17, the valve seat 215 on the tubular member 203 engages the valve member 251 along a line 316 on the valve member 251. (The line 316 is collinear with the line 216 on the tubular member 203 when the valve seat 215 engages the valve member 251.)

It is noted that the portion of the fuel inflow passage 51 between the inflow valve cartridge 261 and the axial bore 45 in the main body portion 31, and the axial bores 45 and 101 located respectively in the main body portion 31 and in the second projecting portion 35 between the valve member 251 and the outflow valve cartridge 271 comprise a high pressure fuel circuit, and that the fuel inflow passage 51, the fuel by-pass passage 57 (upstream of the fuel inflow valve cartridge 261), the axial bore 75 in the first projecting portion 33 (the low pressure fuel chamber 151), the fuel flow passages 137 by-passing the valve stop 135, the axial fuel passage 205 in the tubular member 203, the various fuel flow passages in the stop member 141, and the fuel outflow passage 195 comprise a low pressure fuel circuit.

In this last regard, it is also noted that the low pressure fuel circuit permits continuous, low pressure fuel flow through the fuel pump 13 at all times. More specifically, when the solenoid 311 is not energized the armature member 225 is held against the stop member 141 by the spring 241. As a consequence, inflow of low pressure fuel is initially through the fuel inflow valve cartridge 261, into the high pressure fuel chamber 115, through the fuel by-pass passages 137 in the bushing 125 to the axial bore or fuel passage 205 in the tubular member 203, and then to the counterbore 165 in the stop member 141, and thence through the flow passages therein to the blind bore 183 in the second housing member 25, and finally, exiting through the return or fuel outflow passage or conduit 195. Such fuel flow serves to maintain the high pressure fuel chamber 115 full of fuel and to provide a steady stream of low pressure fuel to carry away any heat flowing from the engine. When the solenoid 311 is energized, the armature assembly moves rapidly, to the right in FIG. 1, through the initial stroke length 353, thereby striking the ball valve member 251 and sealing off the axial bore or fuel passage 205 in the tubular member 203 from the high pressure fuel chamber 115. The impact of the tubular member 203 on the valve member 251 simultaneously causes a pressure surge in the high pressure fuel chamber 115, which pressure surge opens the outflow valve 271 and closes the inflow valve 261. The pressure surge is analogous to a "water hammer" effect. Further movement of the tubular member 203 to the right in FIG. 1, beyond the initial stroke length 353, displaces the valve member 251 away from the valve stop 135 and into the high pressure fuel chamber 115, thereby decreasing the volume of the high pressure fuel chamber 115 and pushing additional fuel out of the high pressure fuel chamber 115 through the valve 271.

Because the valve 261 is closed by the pressure surge, the incoming fuel flows through the by-pass passage or conduit 57 into the low pressure fuel chamber 151 and then from the low pressure fuel chamber 151 through the fuel flow passages 177 and 175 in the stop member 141 to the outflow fuel passage or conduit 195. Thus, regardless of whether the solenoid 311 is energized or deenergized, low pressure fuel continuously flows through the fuel pump 13 and is always available for immediate filling of the high pressure chamber 115 after each delivery therefrom of a fuel charge.

While other constructions or arrangements can be employed, such as mechanical, hydraulic, or electronic arrangements other than the disclosed solenoid 311, in the construction disclosed in FIGS. 1 through 15, the valve member stop 135, the valve member 251, the valve member biasing spring 301, and the end surface 213 formed on the rod 203 and located in spaced relation to said valve member stop in the direction or rod movement toward said high pressure fuel chamber 115, together with the axial fuel passage 127 located in the rod 203, communicating with the high pressure fuel chamber 115, and affording fuel outflow from the high pressure fuel chamber 115, and the valve seat 215 located on the end surface 213 of the rod 203 and engageable with the valve member 251 upon completion of the initial stroke length 353 to thereafter prevent outflow from said high pressure fuel chamber 115, constitute means for displacing the rod 203 through the initial stroke length 353 without encountering substantial resistance to rod movement. In addition, the means for displacing the rod 203 includes the armature member 225 fixed on the rod 203, the spring 241 biasing the rod 203 and armature assembly 221 to the retracted position, and the solenoid 311 which, when energized, causes rod movement toward the high pressure fuel chamber 115.

In order to obtain reliable and repetitively obtain uniform action of fuel pumps manufactured in accordance with the disclosure herein, it is very desirable that the magnetic gap length, i.e., the length 351 between the adjacent inner end surface 227 of the armature and the inner radial surface 83 of the groove 79, and the initial stroke length of the armature assembly, i.e., the length 353 between the fully retracted armature assembly position (when the outer end surface 229 of the armature member 225 is engaged with the inner end surface 155 of the stop member 141) and the position of the armature assembly 221 at the time of initial engagement of the valve seat 215 of the tubular member 203 with the valve member 251, be closely controlled and coordinated. The initial stroke length 353 determines the amount of momentum residing in the armature assembly 221 at the time of engagement with the valve member 251, and the magnetic gap length 351 controls the build up of the magnetic force which causes movement of the armature assembly 221, including movement through the initial stroke length 353. Such control and coordination is accomplished by employment of the counterbore 91 in the third section 65 of the first projecting portion 33 and by location of the stop member 141 in the counterbore 91 and in engagement against the annular shoulder 93. Such counterbore 91 and engagement therewith by the stop member 141 enables coordinated control of the relation between the length 353 of the initial stroke of the armature assembly, and the magnetic gap length 351.

More particularly, and in accordance with a method of the invention, during manufacture, the bushing 125 is fixed in the large diameter portion 47 of the axial bore 45 in the main body portion 31 before the valve stop 125 is machined therein, thereby permitting such machining in relation to the annular shoulder 93.

In addition, because the inner end surface 155 of the stop member 141 extends perpendicularly to the axis 27 and is coplanar with the annular shoulder 93, and because, when in the retracted position, the outer end surface 229 of the armature member 225 engages the inner end surface 155 of the stop member 141 under the action of the spring 241, control of the initial stroke length 353 can be obtained by machining to control the length or distance A between the valve stop 135 of the bushing 125 and the annular shoulder 93 and by machining or assembling to control the distance or length B from the remote or outer end surface 229 of the armature member 225, i.e., the end in engagement with the inner end surface 155 of the stop member 141 (and therefore in the plane of the shoulder 93), to the valve seat 215 of the tubular member 203. The initial stroke length 353 is equal to the difference between lengths A and B minus the distance E between the valve stop 135 (or line 134) and the line 316. The distance E is easily controlled by machining the valve member 251 to a precise diameter. Therefore, because the distances A, B and E are all carefully controlled, the initial stroke length 353 is carefully controlled.

Furthermore, in regard to the magnetic gap length 351, because of the presence of the annular groove 79 which affords access for machining purposes to the outer end (the inner radial surface 83 of the groove 79) of the first section 61 of the first projecting portion 33, the magnetic gap length 351 can be controlled by machining the outer end 83 to control the length or dimension C between the outer end 83 of the first section 61 of the first projecting portion 33 and the annular shoulder 93. In addition, as already pointed out, because, when in the retracted position, the outer end surface 229 of the armature member 225 engages the inner end surface 155 of the stop member 141 under the action of the spring 241, the axial length D to the inner end surface 227 of the armature member 225 from the annular shoulder 93 can be readily controlled by machining the armature member 225 to control the axial length thereof. Thus, manufacturing variation of the magnetic gap length 351 is limited to the difference between these two relatively easily controlled dimensions.

In addition, in order to obtain reliable and repetitively uniform action of fuel pumps 13 manufactured in accordance with the disclosure herein, it is also highly desirable, in order to provide concentricity, to unify the first projecting portion 33, and to assemble the bushing 125 relative thereto, prior to boring the axial bore 127 in the bushing 125 and machining the outer and inner cylindrical surfaces 69 and 77 of the first projecting portion 33. Unification of the first projecting portion 33 involves separate initial fabrication of the first housing member 23 with the first section 61 of the projecting portion 33, separately initially fabricating the third section 65, and initially separately fabricating the intermediate or second section 63.

Figure 11:
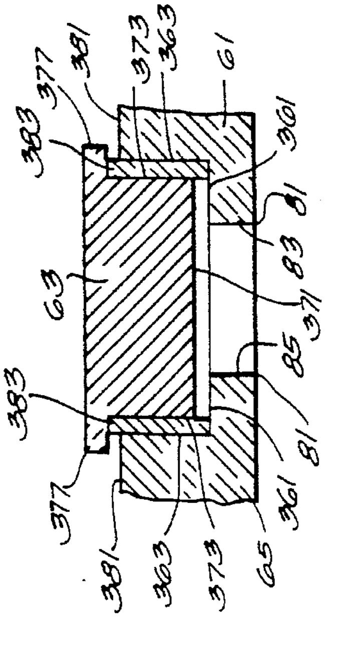
FIG. 11 is a fragmentary view, in section, of a portion of the fuel pump shown in FIG. 1 prior to brazing thereof.

Referring to FIG. 11, the outer end 83 of the first or inner section 61 and the inner end 85 of the third or outer section 65 are both fabricated with facing cutouts which are defined by cylindrical surfaces 361 of the same radius and by radially outwardly extending flat surfaces 363 extending from the cylindrical surfaces 361. The second or middle section 63 is generally cylindrically shaped with an inner cylindrical surface 371 having a diameter slightly larger than the diameter of the cylindrical surfaces 361 of the first and third sections 61 and 65, and with opposed inner and outer radially extending flat faces 373. However, the second section 63 has an outward radial dimension greater than the radial dimension of the radial surfaces 363 and, at each axial end, includes respective axially extending circular flanges 377 which extend oppositely into overlying relation to the unmachined outer surfaces 381 of the first and third sections 61 and 65.

Figure 12:
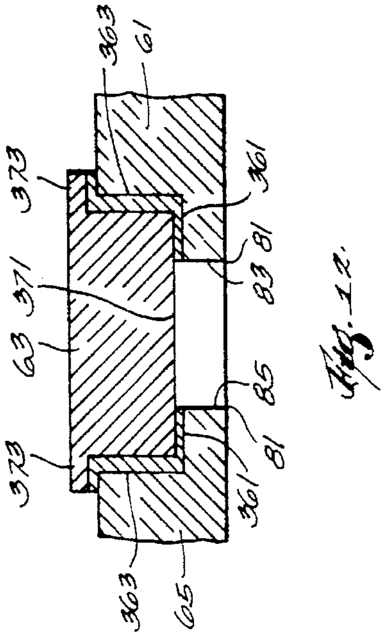
FIG. 12 is a fragmentary sectional view, similar to FIG. 11, of a portion of the fuel pump shown in FIG. 1, after brazing and prior to full machining thereof.

The first projecting portion 33 is unified by placing, between the flat, radially extending faces 373 of the second section 63 and the radial extending surfaces 363 of the first and third sections 61 and 65, respective annular washers 383 of brazing material, and by simultaneously applying, in a known manner, axial loading and heat. As a consequence, the brazing material is liquified and is forced (as shown in FIG. 12) to migrate axially outwardly and under the circular flanges 373, and between the inner cylindrical surface 371 of the second section 63 and the cylindrical surfaces 361 of the first and third sections 61 and 65. When cooled, the brazing provides solid connection along the cylindrical and radial surfaces, as well as definition of the before mentioned annular groove 79 between the first and third sections 61 and 65. After unification, the outer surface of the first projecting portion 33 is machined to reduce the diameter of the second section 63, thereby removing the circular flanges 373 and providing the machined cylindrical outer surface 69. During the same machine set-up, the inner cylindrical surface 77 and the counterbore 91 (including the annular shoulder 93) are machined, and the axial bore 127 in the bushing 125 is machined, so as to obtain concentricity of the axial bore 127 in the bushing 125 with the outer cylindrical surface 69, with the cylindrical inner surface 77 of the axial bore 75, and with the cylindrical inner surface 95 of the counterbore 91.

It is noted that the corners between the inner surface 77 and the outer end 83 of the first section 61 and the inner end 85 of the third section 65 function as the magnetic poles or shoes 81 and serve to concentrate the lines of magnetic flux travelling to and from the armature member 225, thereby increasing the magnetic force which is generated consequent to energization of the solenoid coil 313 and applied to the armature assembly 221.

Figure 15:
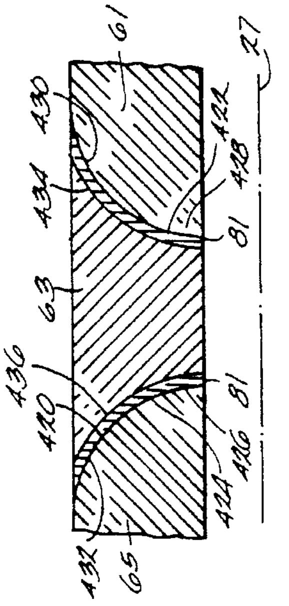
FIG. 15 is a fragmentary view, in section, of still another embodiment of a portion of the fuel pump shown in FIG. 1.
Figure 14:
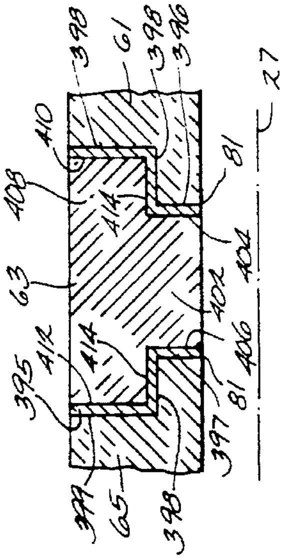
FIG. 14 is a fragmentary view, in section, of yet another embodiment of a portion of the fuel pump shown in FIG. 1.
Figure 13:
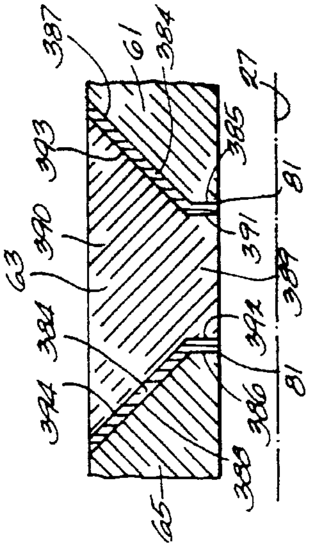
FIG. 13 is a fragmentary view, in section, of an other embodiment of a portion of the fuel pump shown in FIG. 1.

Other constructions, such as shown in FIGS. 13, 14, and 15 can also be employed to concentrate the flux flow to and from the armature assembly 221. More particularly, another construction providing a magnetic gap and defining two spaced magnetic poles or shoes 81 is shown in FIG. 13. In this construction, the first or inner section 61 and the third or outer section 65 are fabricated of suitable material having a low flux reluctance and united by brazing material 384 (in the form of washers) to a second or central or middle section 63 which is fabricated of a suitable material having a high flux reluctance. The first or inner section 61 and the second or outer section 65 respectively include radially inwardly located, axially inner and outer flat faces 385 and 386 extending generally perpendicularly to the axis 27, and radially outwardly located inner and outer faces 387 and 388 respectively extending from the inner and outer faces 385 and 386 in radially outwardly diverging relation to each other.

The middle section 63 includes a radially inner portion 389 having inner and outer faces 391 and 392 extending generally perpendicularly to the axis 27 in generally parallel relation to the inner and outer faces 385 and 386 of the inner and outer sections 61 and 65. In addition, the middle section 63 includes a radially outer portion 390 having inner and outer faces 393 and 394 respectively extending from the inner and outer faces 391 and 392 in radially outwardly diverging relation to each other. It is noted that this construction has relatively sharp corners providing the opposed poles or shoes 81 and that the air gap provided between the poles or shoes by the annular groove 79 in the construction shown in FIG. 1 is missing, i.e., that the inner axially extending surface is smooth.

In the construction shown in FIG. 14, the first or inner section 61 and the third or outer section 65 are fabricated of suitable material having a low flux reluctance and united by brazing material 395 to a second or center or middle section 63 which is fabricated of a suitable material having a high flux reluctance. The first or inner section 61 and the second or outer section 65 respectively include radially inwardly located, axially spaced, inner and outer flat faces 396 and 397 extending generally perpendicularly to the axis 27, and radially outwardly located, inner and outer faces 398 and 399 which are axially spaced at a distance greater than the spacing of the flat faces 396 and 397 and which are connected to the inner and outer flat faces 395 and 396 by a cylindrical surface 398.

The middle section 63 includes a radially inner portion 402 having inner and outer parallel faces 404 and 406 extending perpendicularly to the axis 27 and in generally parallel relation to the radially inwardly located flat faces 395 and 396 of the inner and outer sections 61 and 65, and a radially outer portion 408 having inner and outer parallel faces 410 and 412 which are axially spaced at a distance greater than the axial spacing of the radially inwardly located flat faces 404 and 406. In addition, the outer portion 408 includes a radially inwardly located cylindrical surface 414 which joins the radially inner flat faces 404 and 406 with the radially outer flat faces 410 and 412 and which is generally concentric with the cylindrical surface 398 of the first or inner and second or outer sections 61 and 65. It is noted that this construction also has relatively sharp corners providing the opposed poles or shoes 81 and that the air gap provided between the poles or shoes by the annular groove 79 in the construction shown in FIG. 1 is missing, i.e., that the inner axially extending surface is smooth.

In the construction shown in FIG. 15, the first or inner section 61 and the third or outer section 65 are fabricated of suitable material having a low flux reluctance and united by brazing material 420 to a second or central or middle section 63 which is fabricated of a suitable material having a high flux reluctance. The first or inner section 61 and the second or outer section 65 respectively include axially inner and outer arcuate faces 422 and 424 which have respective radially inner portions 426 and 428 extending generally perpendicularly to the axis 27 and radially outer portions 430 and 432 which radially outwardly diverge.

The middle section 63 includes opposed radially outwardly diverging arcuate surfaces 434 and 436 which, at their radially inner ends, extend approximately perpendicularly to the axis 27 and which extend in generally parallel relation to the inner and outer faces 422 and 424. It is noted that this construction also has relatively sharp corners providing the opposed poles or shoes 81 and that the air gap provided between the poles or shoes by the annular groove 79 in the construction shown FIG. 1 is missing, i.e., that the inner axially extending surface is smooth.

Still other arrangements can also be employed to provide magnetic poles or shoes for concentrating the lines of magnetic flux.

The nozzle assembly 15 of the combined fuel pump and nozzle assembly 11 is generally located in the second counterbore 107 of the axial bore 101 of the second projecting portion 35 and includes a housing 401 having an axially extending main body or portion 403 which is generally of the same diameter throughout, and, at the outer end thereof, a flange portion 405 having an outer threaded cylindrical surface 407 which is threadedly engaged with the threads on the internal surface of the second counterbore 107 of the axial bore 101 of the second projecting portion 35. The main body or portion 403 includes an axial needle valve bore 411, including, adjacent the outer end thereof (see FIG. 5), a conical surface 412 including a line or narrow area of engagement constituting a valve seat 413. The flange portion 405 also includes an axially outer face surface 415 which includes, in addition to the end of the axial bore 411, two diametrically spaced blind bores 421 which are adapted to be engaged by a spanner wrench (not shown) to facilitate threaded engagement of the nozzle assembly 15 in the second counterbore 107 of the second projecting portion 35. In addition, the flange portion 405 includes a back face with an inclined sealing surface 417.

The nozzle assembly 15 also includes a needle member or valve 431 having (see FIG. 5) a stem portion 433 and a valve head or end portion 435 which cooperates with the valve seat 413 formed in the axial bore 411 to provide a pressure operated fuel discharge valve 441. At its inner end, the stem portion 433 is fixedly connected to a retainer 443 (see FIG. 1), as disclosed, for instance in U.S. application Ser. No. 276,718, filed Jul. 18, 1994, which is incorporated herein by reference.

Located in surrounding relation to the main body or portion 403, and between the flange portion 405 and the retainer 443, is a helical spring 445 which biases the needle valve 431 axially inwardly, thereby engaging the valve head 435 with the valve seat 413. When the valve head 435 engages the valve seat 413, the inner end of the retainer 443 is slightly spaced from the shoulder 108 so that fuel can flow from the bore portion 103 into the first counterbore 105.

Figure 5:
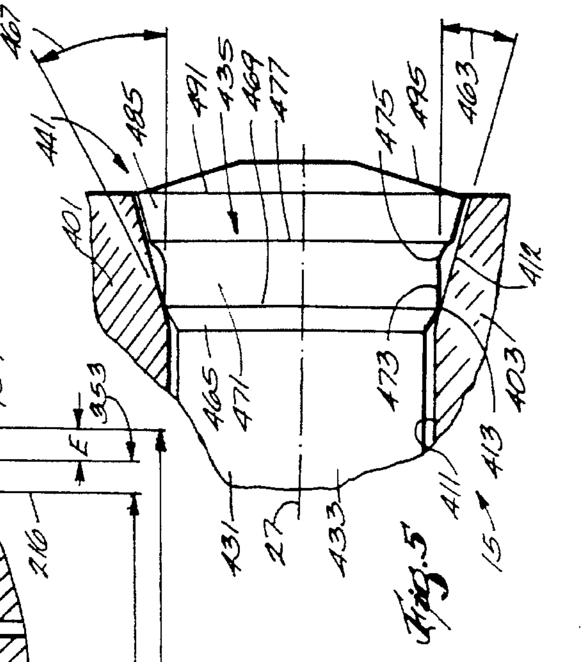
FIG. 5 is an enlarged fragmentary view of the nozzle assembly included in the combined fuel pump and nozzle assembly shown in FIG. 1.

In order to permit fuel flow from the first counterbore 105 to the axial bore 411 of the main body 403, and thereby to the valve seat 413, the main body 403 of the housing 401 includes one or more radial bores 451 which communicate between the axial bore 411 and the interior of the first counter bore 105 of the second projecting portion 35 and which, preferably, are located in closely adjacent relation to the flange portion 405. It should be noted that, as shown in FIG. 5, the diameter of the valve stem portion 433 is less than the diameter of the bore 411 so that fuel can flow in the bore 411 around the stem portion 433.

In order to prevent or at least minimize unwanted opening and closing of the valve head 435 relative to the valve seat 413 at fuel pressures close to the valve-opening or cracking pressure, and to permit the valve 441 to remain open until the fuel pressure falls to a pressure spaced below the opening or valve-cracking pressure, a modified heel type valve construction is employed. In this regard, as shown in FIG. 5, the outer end of the axial bore 411 in the main body 403 of the housing 401 is provided by the conical surface 412 which diverges from the axis 27 at an acute angle 463 and which includes, in adjacently spaced relation from the beginning of the conical surface 412, the valve seat or area 413. In addition, the valve head 435 is provided, at the base thereof adjacent the stem portion 433, with a first outwardly diverging conical surface 465 which axially diverges from the axis 27 at an acute angle 467 greater than the acute angle 463 and which terminates in a circular narrow valve surface or sealing edge 469 adapted to engage the valve seat 413 on the conical surface 412. Outwardly of the valve surface or sealing edge 469, the valve head 435 includes a surface 471 extending axially outwardly in diverging relation to the conical surface 412 of the main body 403 and then in converging relation to the conical surface 412. While other constructions are possible, in the disclosed construction, the surface 471 includes a generally cylindrical surface portion 473 which merges into an arcuately radially outward extending surface portion 475 which terminates in a second edge or surface 477 having a diameter which is substantially greater than the diameter of the valve edge or surface 469 and which, when the valve edge or surface 469 is engaged with the valve seat 413, is spaced from the conical surface 412 of the main body 403 at a slight distance, i.e., at a distance of about 0.0005 to 0.001 inches.

Outwardly of the second edge 477, the valve head 435 includes a conical surface 485 which is generally parallel to the conical surface 412 of the main body 403 and which terminates at a third edge or surface 491. Outwardly of the third edge 491, the valve head 435 includes a converging conical surface 495 which extends for a relatively short axial distance.

As a consequence of the above described construction, the needle valve 431 moves outwardly to crack or open the valve 441 at a given fuel pressure acting on the area circumscribed by the first or valve sealing edge or surface 469. Such outward movement serves to somewhat increase the spacing of the conical surface 485 of the valve head 435 from the conical surface 412 of the main body 403, but this increase is offset and overpowered because the fuel pressure now acts on an enlarged effective area which is downstream of the sealing edge 469 and which includes the enlarged area circumscribed by the second edge 477. As a consequence, a fuel pressure lesser than the cracking pressure will retain the needle valve 431 in open position, thereby reducing or eliminating opening and closing of the valve 441 in response to fuel pressures approximating the cracking pressure.

In order to prevent leakage between the second projecting portion 35 and the nozzle assembly 15, an annular sealing member 499 (see FIG. 1) is held in tight engagement between the inclined sealing surface 109 located intermediate the first and second counterbores 105 and 107 and the inclined sealing surface 417 on the back side of the flange portion 405 of the housing 401 of the nozzle assembly 15.

The combined fuel pump and nozzle assembly 11, as already noted, is mounted on the cylinder head 17 and, in this connection, the cylinder head 17 includes a through mounting bore 501 which has a counterbore 503 defining an annular shoulder 505 extending in inclined relation to the axis 27 and in generally parallel relation to the outer surface 415 of the valve housing 401. Located between the inclined shoulder 505 and the outer surface 415 is a sealing washer 509 which is preferably fabricated of a relatively soft metal.

In addition, the outer end of the second projecting portion 35 extends into the counterbore 503 and the outer end of the projecting portion 35 is clamped to sealingly engage the washer 509 between the outer surface 415 and the annular inclined shoulder 505. While other constructions can be employed, in the disclosed construction, the washer 509 is sealingly engaged by (see especially FIGS. 6 and 7) at least one strap member 511 which, adjacent one end, is fixed to the cylinder head 17 by a bolt 513 and which, at the other end, includes an arcuate recess 515 which defines a marginal area or portion 517 which extends into the inner annular groove 118 in the outer surface of the second projecting portion 35. Preferably, the strap member 511 is fabricated of resilient material, such as steel, and, intermediate the ends thereof, includes an arcuate portion 519 which assists in maintaining the outer surface 415 in tight engagement against the sealing washer 509. In order to further prevent leakage between the cylinder head 17 and the combined fuel pump and nozzle assembly 11, and to prevent entry of debris, the o-ring 119 is located in the outer annular groove 117 in the outer surface of the second projecting portion 35 and in sealing engagement with the outer surface of the second projecting portion 35 and the cylinder head 17.

Figure 8:
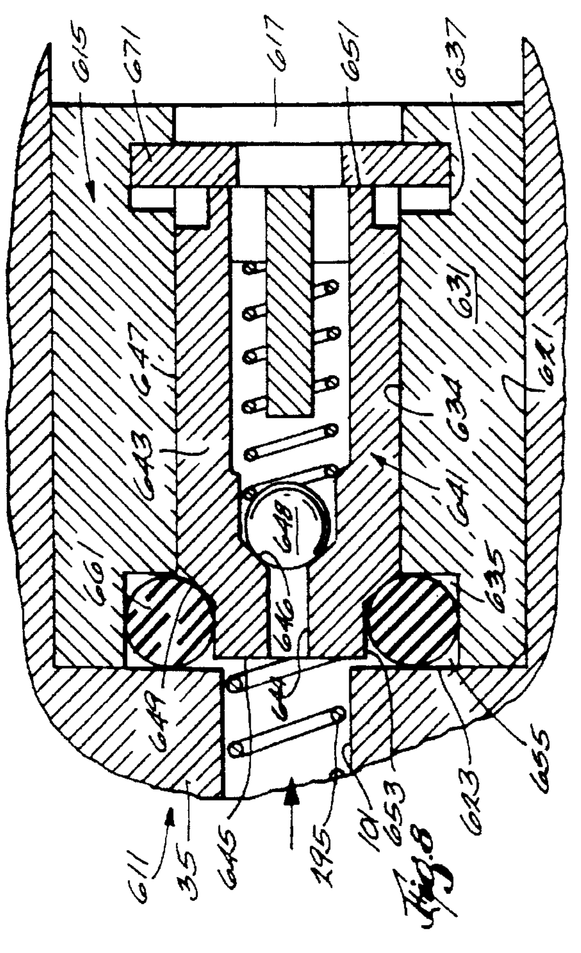
FIG. 8 is a fragmentary view, in section, of an alternate valve cartridge construction which permits limited movement of the cartridge toward the high pressure fuel chamber when the pressure in the high pressure fuel chamber is relatively low.

Shown fragmentarily in FIG. 8 is an other embodiment of a combined fuel pump and nozzle assembly 611 which, except as noted hereinafter, is constructed in generally identical manner as the combined fuel pump and nozzle assembly 11.

The combined fuel pump and nozzle assembly 611 differs from the combined fuel pump and nozzle assembly 11 in that the combined fuel pump and nozzle assembly 611 includes a fuel outflow valve or valve cartridge 615 which affords relief of the fuel pressure in the space or area 617 (see FIG. 1) upstream of the nozzle assembly 15 and downstream of the high pressure fuel chamber 115 when the pressure in the high pressure fuel chamber 115 is relatively low and the pressure in the space or area 617 upstream of the nozzle assembly 15 and downstream of the high pressure fuel chamber 115 is higher than the pressure in the high pressure fuel chamber 115. Expressed in other terms, the fuel outlet valve 615 shown in FIG. 8 includes means for lessening the pressure downstream of the fuel outlet valve 615 when the pressure in the high pressure fuel chamber 115 is below the pressure downstream of the fuel outlet valve 615. More specifically, the fuel outlet valve 615 is resiliently mounted in the axial bore 101 of the second projecting portion 35 for limited axial movement therein so as to, at least partially, reduce or limit increasing fuel pressure in the space or volume 617 between the fuel outflow valve or cartridge 615 and the discharge valve 441 of the nozzle assembly 15. In this last regard, under some circumstances, heat present in the combined fuel pump and nozzle assembly 611 and relative opening and closing of the discharge valve 441 and the fuel outflow valve or cartridge 615 can, during the interval between pump operations, cause an undesirable increase or cyclical variation in the pressure of the fuel occupying the space or volume 617 between the fuel outflow valve or cartridge 615 and the discharge valve 441, and thereby cause variation in the amount of fuel discharged during successive operations of the nozzle assembly 15.

Accordingly, in order to reduce or eliminate such increases in fuel pressure in the space or volume 617 between the fuel outflow valve or cartridge 615 and the discharge valve 441 during the intervals between pump operations, the combined fuel pump and nozzle assembly 611 includes (see FIG. 8) a second projecting portion 35 with an axial bore 101 having, instead of the threaded portion, a counterbore 621 which defines a transverse end wall or annular shoulder 623 and which receives a fuel outlet valve or cartridge 615 including an outer housing 631 which is press fitted or otherwise suitably fixed in the counterbore 621 and in engagement with the end wall 623. The outer housing 631 includes a through axial bore 634 having, at the inlet end thereof, an open groove or counterbore 635, and having, adjacent the outlet end thereof, an annular groove 637.

The fuel outlet valve cartridge 615 also includes, in the axial bore 634, a valve cartridge 641 which is somewhat modified as compared to the fuel outflow valve cartridge 271 previously described. In this regard, the valve cartridge 641 includes a cartridge housing or valve member 643 which includes an axial bore 644 defining a valve seat 646 relative to which a second valve member 648, in the form of a ball, is moveable. The cartridge housing or valve member 643 also includes a transverse inlet end wall 645 which engages the biasing spring 295, a cylindrical outer surface 647 slideably engaged in the axial bore 643 in the outer housing 631, and, at the inlet end thereof, an inclined surface 649 extending between the inlet end wall 645 and the cylindrical outer surface 647 and a cylindrical outer wall 653 extending from the inclined wall 649 to the transverse wall 645. There is thus defined an annular space 655 located between the counterbore or open groove 635, the inclined surface 649, the cylindrical surface 653, and the end wall 623.

The inlet end wall 645 is normally somewhat spaced from the end wall 623 to afford movement of the valve cartridge 641 in the direction of the high pressure fuel chamber 115. Because the diameter of the cylindrical surface 653 is greater than the diameter of the bore 101, the result is that the end or transverse wall 645 is engageable with the end wall 623 to limit such movement toward the high pressure fuel chamber 115. In addition, the cartridge housing 643 includes an outlet end wall or surface 651.

The fuel outflow valve assembly 615 included means for permitting limited axial movement of the valve cartridge 641 relative to the outer housing 631, i.e., toward and away from the high pressure fuel chamber 115. In this regard, the fuel outflow valve assembly 615 also includes a resilient member, such as an o-ring 661, which is located in the annular space 655 defined by the open groove or counterbore 635, the inclined wall 649, the cylindrical surface 653, and the end wall or shoulder 623 of the counterbore 621. At the outflow end, the outlet end wall or surface 651 of the cartridge housing 643 engages a retaining spring clip 671 which is located in the groove 637.

Thus, whenever the fuel pressure in the space 617 between the fuel outflow valve cartridge 615 and the discharge valve 441 of the nozzle assembly 15 increases above the pressure of the fuel in the high pressure chamber 115, the valve cartridge 641 moves leftward in the drawings to squeeze the resilient O-ring 661 and to increase the volume of the space or volume 617 between the valve cartridge 641 and the discharge valve 441, thereby lowering the pressure in this space 617.

Figure 9:
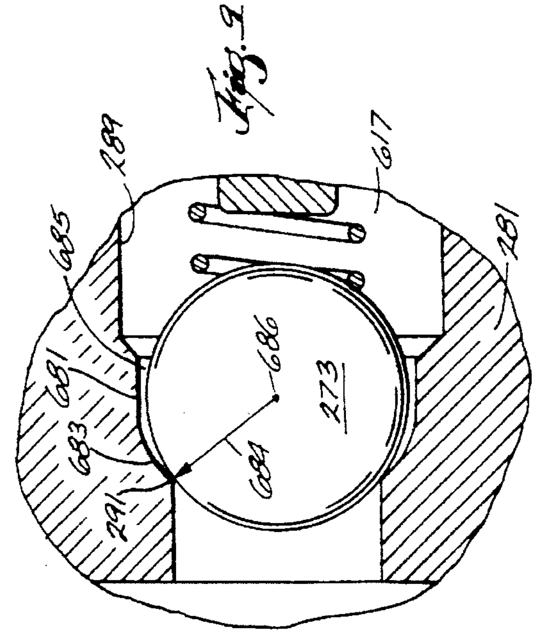
FIG. 9 is a fragmentary view, in section, of an alternate construction affording outflow from the high pressure fuel chamber when the pressure in the high pressure fuel chamber is above a given pressure and for affording limited back flow when the pressure in the high pressure fuel chamber is relatively low.
Figure 6:
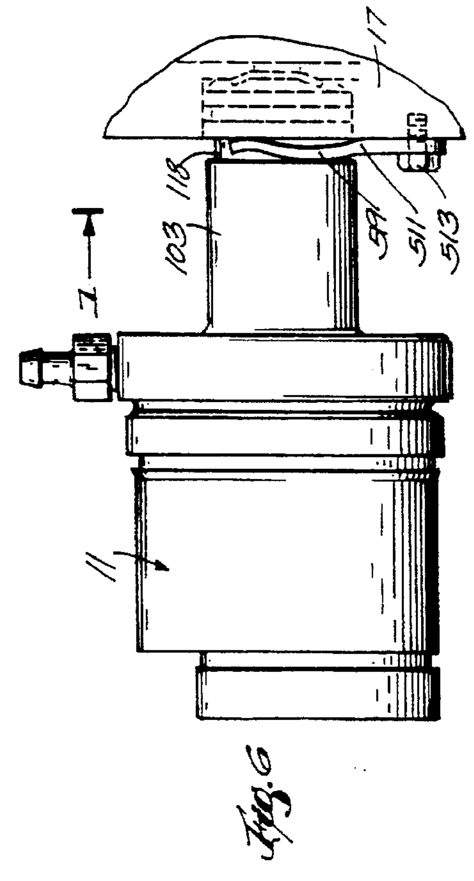
FIG. 6 is an elevational view of the arrangement for attaching the combined fuel pump and nozzle assembly to a cylinder head.

Alternatively, such elimination or diminishment of the effect of increasing pressure can also be obtained by modifying the outflow valve cartridge 271 to form the valve seat 291 in such manner as to, prior to fully effective sealing engagement of the valve member 273 with the valve seat 291, allow limited fuel flow into the high pressure fuel chamber 115 from the space or volume 617 between the outflow valve cartridge 271 and the discharge valve 441 during the occurrence of fuel pressure in the space 617 above the fuel pressure in the high pressure chamber 115. Thus, as shown in FIG. 9, the valve seat 291 is limited to a line or thin area of engagement or by an interrupted line or area of engagement. In addition, in the illustrated construction, the outer housing 281 includes a surface 681 which extends from the limited valve seat 291 to the counterbore 289 and which is defined, at least in part, by an arcuate surface portion 683 having a radius 684 extending from a center 686 (the center of the seated ball 273), which radius 684 progressively increases from the limited valve seat 291 (to the right in FIG. 9), thereby to provide an arcuately extending wedge-shaped gap 685 between the ball valve member 273 and the adjacent surface portion 683.

Shown in FIG. 16 is an other embodiment of a combined fuel pump and nozzle assembly 811 which, except as noted hereinafter, is constructed in generally identical manner as the combined fuel pump and nozzle assembly 11, and which is shown with reference numbers identical to the reference numbers applied to FIG. 1.

The combined fuel pump and nozzle assembly 811 includes a fuel inflow passage 813 which communicates with the high pressure fuel chamber 115 adjacent the outflow valve cartridge 271, as compared to the communication of the fuel inflow passage 51 with the high pressure fuel chamber 115 adjacent the bushing 125, as described in connection with the embodiment shown in FIG. 1. In addition, the combined fuel pump and nozzle assembly 811 includes an armature assembly 815 with a solid rod 817 which does not include the axial fuel passage 205 included in the tubular member 203. Also, the bushing 125 defines a valve seat 819 against which the ball 251 seats to close off the high pressure fuel chamber 115 from the space 821 between the rod 817 and the valve seat 819. After the ball 251 seats, continued retraction of the rod 817 (to the left in FIG. 16) creates a vacuum in the space 821. This vacuum is eliminated, and the pressures in the space 821 and in the high pressure fuel chamber 115 are equalized, when the rod 817 returns to the position in which the rod 817 unseats the ball 251. Still further in addition, the combined fuel pump and nozzle assembly 811 omits the flow passages 137 extending in by-passing relation to the stop 135.

Alternatively, the rod 817 could be replaced by the tubular member 203 of FIG. 1 and the bushing 125 could be provided with passages allowing fuel to flow around the seated ball 251 from the high pressure fuel chamber 115 to the tubular member 203. In this case, the location of the fuel inflow passage 51 in FIG. 16 serves to temporarily include the high pressure fuel chamber 115 in the low pressure fuel circuit (when the solenoid 311 is deenergized and the armature assembly 221 is in the retracted position), thereby preventing stagnation of the fuel in the high pressure chamber 115 by causing fuel flow through the high pressure chamber 115 from the discharge end thereof to the tubular member 203 so as to carry away heated fuel in the high pressure fuel chamber 115. Similarly, the assembly 11 of FIG. 1 could have the inflow valve 261 located at the right end of the high pressure fuel chamber 115 (as in the assembly 811) rather than at the left end of the chamber 115.

In still another modification, the combined fuel pump and nozzle assembly 811 differs from the combined fuel pump and nozzle assembly 11 in that the valve member 251, the spring 301, and the seat on the bushing 125 are omitted, and in that alternate means are included for providing the solid rod 817 with an initial stroke length which is without substantial resistance to movement. While other constructions can be employed, in this modified construction, there is provided, as shown in dotted lines in FIG. 16, a fuel by-pass branch passage or conduit 824 which extends between the fuel by-pass passage 57 and the axial bore 127 in the bushing 125. The by-pass branch passage 824 communicates with the axial bore 127 at a location which is spaced from the end of the rod 817 at a distance such that the rod 817 moves through an initial stroke length from the fully retracted position before the by-pass branch passage 824 is closed by movement therepast of the end of the solid rod 817 toward the high pressure chamber 115.

While other constructions or arrangements can be employed, in the construction described immediately above, and shown in dotted outline in FIG. 16, the fuel passage 824 communicating with the high pressure fuel chamber 115 and affording fuel outflow therefrom, taken with means for discontinuing the communication with the high pressure fuel chamber 115 upon completion of the initial stroke length of the rod 817, constitute means for displacing the rod 817 through an initial stroke length without encountering substantial resistance to rod movement.

While other constructions or arrangements can be employed, in the construction described immediately above, and shown in dotted outline in FIG. 16, the location of the communication of the fuel passage 824 with the axial bearing bore 127 is such that the rod 817 closes such communication upon completion of the initial stroke length, constitutes means for discontinuing the communication between the fuel passage 821 and the high pressure fuel chamber 115 upon completion of the initial stroke length. In addition, as with the construction shown in FIGS. 1 through 15, the means for displacing the rod 817 includes the armature member 225 fixed on the rod 817, the spring 241 biasing the rod 817 and armature assembly 221 to the retracted position, and the solenoid 311 which, when energized, causes rod movement toward the high pressure fuel chamber 115.

Various of the features are set forth in the following claims.

We claim:

1. A valve construction comprising a main body having therein a bore extending along an axis, adapted to contain fuel under pressure, and having, at the axially outer end thereof, an axially outwardly diverging conical surface extending at a first acute angle to the axis, and a needle valve located in said axial bore, movable relative to said main body between open and closed positions, and including a stem portion, and a head portion including a first diverging conical surface which extends axially outwardly from said stem portion at a second acute angle greater than said first acute angle and terminates in a first edge which, when said needle valve is in said closed position, sealingly engages said conical surface of said main body, and which has a diameter, a second surface which extends axially outwardly from said first edge and radially outwardly from axis and which terminates in a second edge having a diameter substantially greater than said diameter of said first edge, and a diverging conical surface which extends axially outwardly from said second edge and which, when said needle valve is in said closed position, is located in slightly spaced parallel relation to said conical surface of said main body.

2. A valve construction in accordance with claim 1 wherein said second surface includes a first portion extending axially outwardly from said first edge in diverging relation to said conical surface of said main body, and a second portion extending axially outwardly from said first portion in converging relation to said conical surface of said main body and terminating in said second edge.

3. A valve construction comprising a main body having therein a bore extending along an axis, adapted to contain fuel under pressure, and having, at the axially outer end thereof, an axially outwardly diverging conical surface extending at a first acute angle to the axis, and a needle valve located in said axial bore, movable relative to said main body between open and closed positions, and including a stem portion, and a head portion including a first diverging conical surface which extends axially outwardly from said stem portion at a second acute angle greater than said first acute angle and terminates in a first edge which, when said needle valve is in said closed position, sealingly engages said conical surface of said main body, and which has a diameter, a second surface which extends axially outwardly from said first edge in increasingly spaced relation from said conical surface of said main body and then in decreasingly spaced relation from said conical surface of said main body and which terminates in a second edge having a diameter substantially greater than said diameter of said first edge, and a diverging conical surface which extends axially outwardly from said second edge and which, when said needle valve is in said closed position, is located in slightly spaced parallel relation to said conical surface of said main body.

4. A valve construction in accordance with claim 3 wherein said second surface includes a first portion extending axially outwardly from said first edge in diverging relation to said conical surface of said main body, and a second portion extending axially outwardly from said first portion in converging relation to said conical surface of said main body and terminating in said second edge.

5. A valve construction comprising a main body having therein a bore extending along an axis, adapted to contain fuel under pressure, and having, at the axially outer end thereof, an axially outwardly diverging conical surface extending at a first acute angle to the axis, and a needle valve located in said axial bore, movable relative to said main body between open and closed positions, and including a stem portion, and a head portion including a first diverging conical surface which extends axially outwardly from said stem portion at a second acute angle greater than said first acute angle and terminates in a first edge which, when said needle valve is in said closed position, sealingly engages said conical surface of said main body, and which has a diameter, a second surface which includes a first portion extending axially outwardly from said first edge in diverging relation to said conical surface of said main body, and a second portion extending axially outwardly from said first portion in converging relation to said conical surface of said main body and terminating in a second edge having a diameter greater than said diameter of said first edge, a diverging conical surface which extends axially outwardly from said second edge, which, when said needle valve is in said closed position, is located in slightly spaced parallel relation to said conical surface of said main body and which terminates in a third edge, and a converging conical surface which extends axially outwardly from said third edge.

6. A valve construction in accordance with claim 5 wherein the first portion is cylindrical, and wherein the second portion extends arcuately in radially outwardly flaring relation to the first cylindrical portion.

* * * * *